United States Patent
Gibson

(10) Patent No.: US 11,552,977 B2
(45) Date of Patent: Jan. 10, 2023

(54) ANOMALOUS NETWORK NODE BEHAVIOR IDENTIFICATION USING DETERMINISTIC PATH WALKING

(71) Applicant: British Telecommunications Public Limited Company, London (GB)

(72) Inventor: Michael Gibson, London (GB)

(73) Assignee: British Telecommunications Public Limited Company, London (GB)

( * ) Notice: Subject to any disclaimer, the term of this patent is extended or adjusted under 35 U.S.C. 154(b) by 302 days.

(21) Appl. No.: 16/738,614

(22) Filed: Jan. 9, 2020

(65) Prior Publication Data

US 2020/0220892 A1 Jul. 9, 2020

(30) Foreign Application Priority Data

Jan. 9, 2019 (EP) ..................................... 19150867

(51) Int. Cl.
*H04L 29/06* (2006.01)
*H04L 9/40* (2022.01)
(Continued)

(52) U.S. Cl.
CPC ...... *H04L 63/1433* (2013.01); *G06F 16/9024* (2019.01); *H04L 45/122* (2013.01);
(Continued)

(58) Field of Classification Search
CPC ... H04L 63/1433; H04L 45/122; H04L 47/17; H04L 63/1425; G06F 16/9024; G06F 17/16
See application file for complete search history.

(56) References Cited

U.S. PATENT DOCUMENTS 9,185,095 B1 11/2015 Moritz et al.
9,514,293 B1 12/2016 Moritz et al.
(Continued)

FOREIGN PATENT DOCUMENTS

CN 107633263 A 1/2018
EP 3355547 A1 8/2018
(Continued)

OTHER PUBLICATIONS

Page et al., "The PageRank Citation Ranking: Bringing Order to the Web" Jan. 29, 2018, 17 pages.
(Continued)

*Primary Examiner* — Shin-Hon (Eric) Chen
(74) *Attorney, Agent, or Firm* — Patterson Thuente, P.A.

(57) ABSTRACT

A computer implemented method of identifying anomalous behavior of a computer system in a set of intercommunicating computer systems, each computer system in the set being uniquely identifiable, the method including monitoring communication between computer systems in the set for a predetermined baseline time period to generate a baseline vector representation of each of the systems; monitoring communication between computer systems in the set for a subsequent predetermined time period to generate a subsequent vector representation of each of the systems; comparing baseline and subsequent vector representations corresponding to a target computer system using a vector similarity function to identify anomalous behavior of the target system in the subsequent time period compared to the baseline time period, wherein a vector representation of the target system for a time period is generated based on a deterministic walk of a graph representation of communications between the computer systems in which nodes of the graph correspond to computer systems in the set and weighted directed edges between nodes of the graph corre- (Continued)

spond to a characteristic of communication between pairs of computer systems in the set.

16 Claims, 4 Drawing Sheets

(51) Int. Cl.
```
G06F 16/901      (2019.01)
H04L 45/122      (2022.01)
H04L 47/17       (2022.01)
G06F 17/16       (2006.01)
```
(52) U.S. Cl.
CPC .......... *H04L 47/17* (2013.01); *H04L 63/1425* (2013.01); *G06F 17/16* (2013.01)

(56) References Cited

U.S. PATENT DOCUMENTS

| | | | |
|---|---|---|---|
| 9,798,876 B1* | 10/2017 | Parker-Wood | G06F 21/554 |
| 10,749,883 B1* | 8/2020 | Martin | G06F 21/554 |
| 10,949,534 B2 | 3/2021 | Martin et al. | |
| 11,108,787 B1 | 8/2021 | Shen et al. | |
| 2005/0193281 A1 | 9/2005 | Ide et al. | |
| 2009/0234899 A1 | 9/2009 | Kramer | |
| 2010/0114973 A1 | 5/2010 | Goyal | |
| 2012/0072983 A1 | 3/2012 | McCusker et al. | |
| 2012/0131674 A1 | 5/2012 | Wittenschlaeger | |
| 2014/0096249 A1 | 4/2014 | Dupont et al. | |
| 2014/0245443 A1 | 8/2014 | Chakraborty | |
| 2014/0279762 A1 | 9/2014 | Xaypanya et al. | |
| 2015/0020199 A1* | 1/2015 | Neil | H04L 63/1433 726/23 |
| 2015/0269050 A1 | 9/2015 | Filimonov et al. | |
| 2016/0021141 A1 | 1/2016 | Liu et al. | |
| 2016/0205122 A1 | 7/2016 | Bassett | |
| 2016/0359695 A1 | 12/2016 | Yadav et al. | |
| 2017/0126712 A1* | 5/2017 | Crabtree | G06N 7/005 |
| 2017/0279698 A1 | 9/2017 | Sartran et al. | |
| 2018/0004948 A1 | 1/2018 | Martin et al. | |
| 2018/0103052 A1 | 4/2018 | Choudhury et al. | |
| 2018/0152468 A1* | 5/2018 | Nor | H04L 63/1425 |
| 2018/0219895 A1 | 8/2018 | Silver et al. | |
| 2018/0260562 A1* | 9/2018 | Chen | G06F 21/566 |
| 2018/0336437 A1 | 11/2018 | Cheng et al. | |
| 2018/0367548 A1* | 12/2018 | Stokes, III | H04L 63/145 |
| 2019/0132344 A1 | 5/2019 | Lem et al. | |
| 2019/0173899 A1* | 6/2019 | Tews | G06N 7/005 |
| 2019/0312734 A1 | 10/2019 | Wentz et al. | |
| 2020/0067969 A1 | 2/2020 | Abbaszadeh et al. | |
| 2020/0304523 A1 | 9/2020 | Yadav et al. | |

FOREIGN PATENT DOCUMENTS

| | | |
|---|---|---|
| WO | WO-2017019391 A1 | 2/2017 |
| WO | WO2017167544 A1 | 10/2017 |
| WO | WO2017167545 A1 | 10/2017 |
| WO | WO2018224669 A1 | 12/2018 |
| WO | WO2018224670 A1 | 12/2018 |

OTHER PUBLICATIONS

Mikolov et al., "Efficient Estimation of Word Representations in Vector Space", Sep. 7, 2013, 12 pages.
Mark Heimann et al., "On Generalizing Neural Node Embedding Methods to Multi-Network Problems", MLG' 17, Aug. 2017, 4 pages.
Sean R Eddy, "What is a Hidden Markov Model?", Nature Biotechnology vol. 22, pp. 1315-1316, Oct. 2004.
Muromägi et al. "Linear Ensembles of Word Embedding Models" Apr. 5, 2017, 9 pages.
Combination Search and Examination Report under Sections 17 & 18(3) for Great Britain Application No. 1819711.1, dated Jun. 10, 2019, 5 pages.
Extended European Search Report for European Application No. 18209886.3, dated Feb. 27, 2019, 6 pages.
Extended European Search Report for European Application No. 19212759.5, dated Apr. 14, 2020, 6 pages.
Grover A., et al., "node2vec: Scalable Feature Learning for Networks," arXiv: 1607.00653v1 [cs.SI], Jul. 3, 2016, 10 pages.
Gärtner T., et al., "On Graph Kernels: Hardness Results and Efficient Alternatives," COLT/Kernel 2003, Learning Theory and Kernel Machines, Lecture Notes in Computer Science, vol. 2777, Springer, Berlin, Heidelberg, https://doi.org/10.1007/978-3-540-45167-9_11, pp. 129-143.
Jinwon A., et al., "Variational Autoencoder based Anomaly Detection using Reconstruction Probability," SNU Data Mining Center, Feb. 2015 Special Lecture on IE, Dec. 27, 2015, 18 pages.
Muromagi A., et al., "Linear Ensembles of Word Embedding Models," Proceedings of the 21st Nordic Conference of Computational Linguistics, Gothenburg, Sweden, May 23-24, 2017, pp. 96-104.
Niepert M., et al., "Learning Convolutional Neural Networks for Graphs," Proceedings of the 33 rd International Conference on Machine Learning, arXiv: 1605.05273v4 [cs.LG], Jun. 8, 2016, 10 pages.
Pei J., et al., "Advances in Knowledge Discovery and Data Mining, Part II," 17th Pacific-Asia Conference, PAKDD 2013, Gold Coast, Australia, Apr. 2013, Proceedings, Part II, 608 pages.
Vishwanathan S.V.N., et al., "Graph Kernels," Journal of Machine Learning Research, 2010, vol. 11, pp. 1201-1242.
Weisstein E. W., "Isomorphic Graphs," WolframMathworld, From MathWorld—A Wolfram Web Resource, http://mathworld.wolfram.com/IsomorphicGraphs.html (Accessed Oct. 2018), 2 pages.
Zhang J., et al., "Robust Network Traffic Classification," IEEE/ACM Transactions on Networking, vol. 23, No. 4, Aug. 2015, pp. 1257-1270.
Campello R.J.G.B., et al., "Density-Based Clustering Based On Hierarchical Density Estimates," In Prosecution Advances in Knowledge Discovery and Data Mining, Part II, LNAI 7819, 2013, pp. 160-172.
Ester M, et al., "A Density-Based Algorithm For Discovering Clusters In Large Spatial Databases With Noise," Proceedings of Knowledge Discovery and Data Mining, AAAI, 1996, 6 pages.
Extended European Search Report for Application No. 19217369.8, dated May 15, 2020, 10 pages.
Mikolov T., et al., "Efficient Estimation Of Word Representations In Vector Space," ArXiv, CoRR (Computing Research Repository), 2013, 12 pages.
Ring M., et al., "IP2Vec: Learning Similarities Between IP Addresses," IEEE International Conference on Data Mining Workshops, 2017, 10 pages.
Rumelhart D.E., et al., "Learning Internal Representations By Error Propagation," Institute for Cognitive Science Report 8506, Sep. 1985, 49 pages.
Application and File History for U.S. Appl. No. 16/701,857, filed Dec. 3, 2019, Inventor: Giulio Giaconi.
Chandola V., et al., "Anomaly Detection for Discrete Sequences: A Survey," IEEE Transactions on Knowledge and Data Engineering, vol. 24, No. 5, May 2012, pp. 823-838.
Combined Search and Examination Report under Sections 17 and 18(3) for Great Britain Application No. 1819703.8, dated May 13, 2019, 6 pages.
Combined Search and Examination Report under Sections 17 and 18(3) for Great Britain Application No. 1917557.9, dated May 20, 2020, 5 pages.
Extended European Search Report for Application No. 19150867.0, dated Jun. 6, 2019, 10 pages.
Extended European Search Report for European Application No. 18209885.5, dated Mar. 6, 2019, 6 pages.
Goyal P., et al., "Capturing Edge Attributes via Network Embedding," IEEE Transactions on Computational Social Systems, vol. 5(4), Apr. 2018, 10 pages.
Goyal P., et al., "DynGEM: Deep Embedding Method for Dynamic Graphs," University of Southern California, Retrieved from the Internet: https://arxiv.org/pdf/1805.11273.pdf on May 29, 2018, 8 pages.

(56) References Cited

OTHER PUBLICATIONS

Izakian H., et al., "Anomaly Detection and Characterization in Spatial Time Series Data: A Cluster-Centric Approach," IEEE Transactions on Fuzzy Systems, vol. 22, No. 6, Dec. 2014, pp. 1612-1624.

Izakian H., et al., "Clustering Spatiotemporal Data: An Augmented Fuzzy C-Means," IEEE Transactions on Fuzzy Systems, vol. 21, No. 5, Oct. 2013, pp. 855-868.

Kim T., et al., "Web Traffic Anomaly Detection using C-LSTM Neural Networks," Expert Systems with Applications, vol. 106, Apr. 5, 2018, pp. 66-76.

Li J., et al., "Multivariate Time Series Anomaly Detection: A Framework of Hidden Markov Models," Applied Soft Computing, vol. 60, Jun. 20, 2017, pp. 229-240.

Radford B.J., et al., "Network Traffic Anomaly Detection Using Recurrent Neural Networks," Mar. 28, 2018, XP055554771, Retrieved from the Internet, https://arxiv.org/pdf/1803.10769.pdf, 7 pages.

Search Report under Section 17 for Great Britain Application No. 1900272.4, dated May 28, 2019, 5 pages.

Yu W., et al., "Learning Deep Network Representations with Adversarially Regularized Autoencoders," Proceedings of the 24th ACM SIGKDD International Conference on Knowledge Discovery & Data Mining, KDD '18, vol. 23, XP055559657, Aug. 19, 2018, pp. 2663-2671.

\* cited by examiner

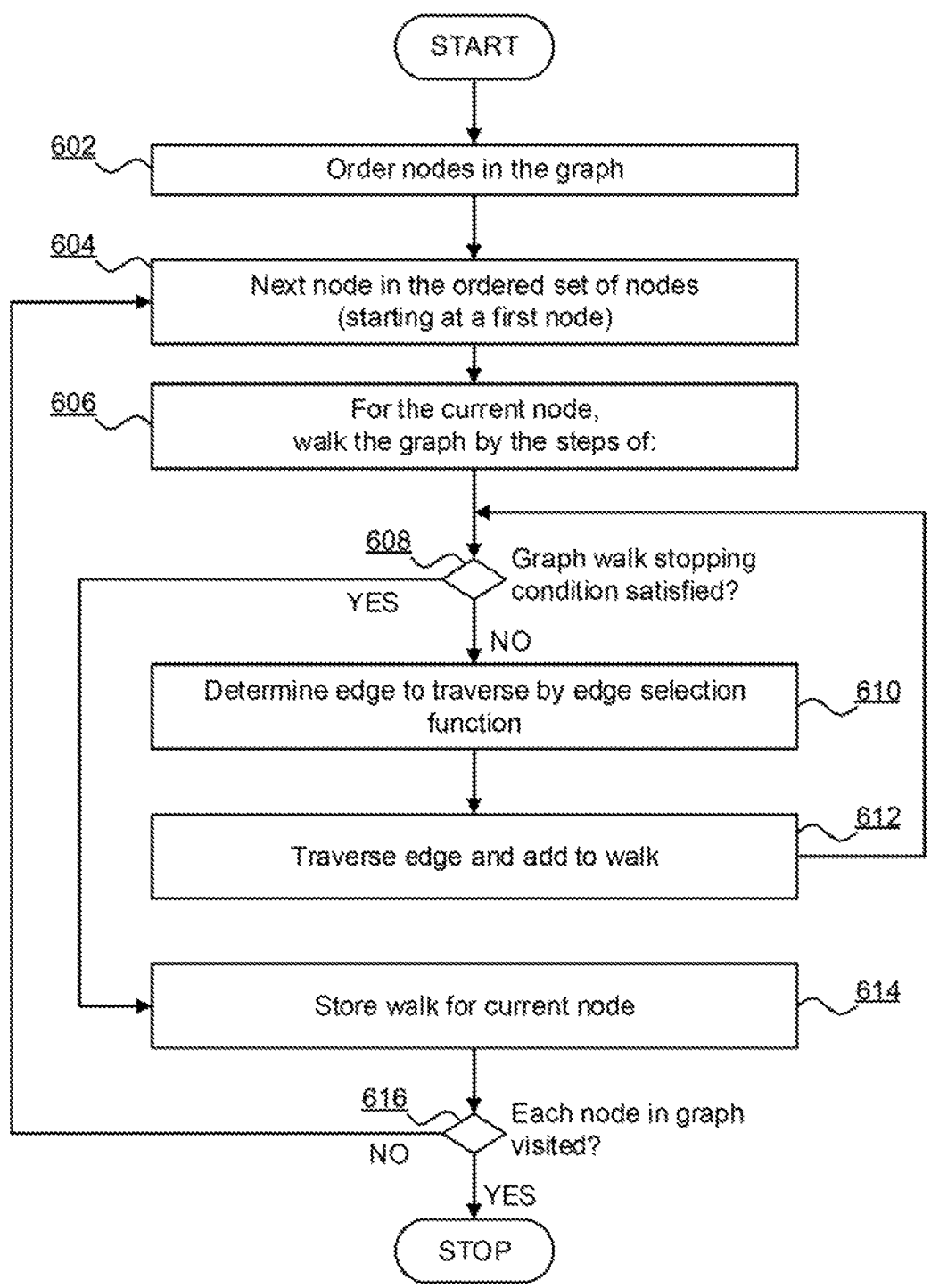

ANOMALOUS NETWORK NODE BEHAVIOR IDENTIFICATION USING DETERMINISTIC PATH WALKING

CROSS-REFERENCE TO RELATED APPLICATION

The present application claims priority to EP Application No. 19150867.0 filed Jan. 9, 2019, which is hereby incorporated in its entirety by reference.

TECHNICAL FIELD

The present disclosure relates to the detection of anomalous behavior of a computer system.

BACKGROUND

Network connected computer systems, whether physical and/or virtual computer systems connected via one or more physical and/or virtual network communication mechanisms, can be susceptible to malicious attack. For example, one or more computer systems can become infected with malicious software such as botnet agents or the like, and such infected systems can instigate malicious communication with other systems such as communications intended to propagate such infections and/or communications intended to affect the operation of target computer systems (e.g. denial of service attacks, hijacking or the like).

SUMMARY

It is a longstanding desire to detect such malicious communication occurring in a network of computer systems in order that mitigation measures can be implemented.

The present disclosure accordingly provides, in a first aspect, a computer implemented method of identifying anomalous behavior of a computer system in a set of intercommunicating computer systems, each computer system in the set being uniquely identifiable, the method comprising: monitoring communication between computer systems in the set for a predetermined baseline time period to generate a baseline vector representation of each of the systems; monitoring communication between computer systems in the set for a subsequent predetermined time period to generate a subsequent vector representation of each of the systems; comparing baseline and subsequent vector representations corresponding to a target computer system using a vector similarity function to identify anomalous behavior of the target system in the subsequent time period compared to the baseline time period, characterized in that a vector representation of the target system for a time period is generated based on a deterministic walk of a graph representation of communications between the computer systems in which nodes of the graph correspond to computer systems in the set and weighted directed edges between nodes of the graph correspond to a characteristic of communication between pairs of computer systems in the set.

In some embodiments, the deterministic walk is a walk of the graph commencing at a node corresponding to the target system and continuing along edges of the graph based on a deterministic edge selection function at each node of the graph.

In some embodiments, the edge selection function includes a determination of which edge to traverse for a current node in the graph based on a weight of the edge in comparison to weights of other edges for the current node.

In some embodiments, multiple edges having identical edge weights are differentiated deterministically based on a characteristic of a node to which the edge leads in the graph such that the determination of which edge to traverse is based on the deterministic differentiation.

In some embodiments, the deterministic walk of the path is bounded to a maximum walk length.

In some embodiments, the deterministic walk is one of a set of deterministic walks of the graph, and the walks in the set are conducted in an order determined at least partly by a degree nodes in the graph, and wherein a traversal of an edge between nodes for a walk of the graph triggers a decreasing of a weight of the traversed edge so as to progressively deemphasize traversed edges for subsequent walks of the graph.

In some embodiments, where two or more nodes have identical degree, the order of walks in the set for the two or more nodes is further determined based on an deterministic ordering of a characteristic of each node.

In some embodiments, the set of deterministic walks includes sufficient walks of the graph such that each node in the graph is visited at least once across all walks in the set.

In some embodiments, the vector similarity function is a cosine similarity function.

In some embodiments, the characteristic of communication includes one or more of: a flow of network traffic from a source computer system to a target computer system; and a volume of data communicated from a source computer system to a target computer system.

In some embodiments, a direction of an edge in the graph corresponds to a net direction of flow of network traffic between a source and target computer systems in a communication.

In some embodiments, a weight of an edge in a graph corresponds to a volume of data communicated.

In some embodiments, the method further comprises, responsive to the identification of anomalous behavior, implementing protective measures for one or more computer systems in the set to protect against malicious communication involving the computer system exhibiting anomalous behavior.

In some embodiments, the protective measures include one or more of: preventing network communication to and/or from a particular computer system; performing an antimalware task on one or more of the computer systems; disconnecting one or more of the computer systems; and increasing a level of monitoring of network communication with one or more computer systems.

In some embodiments, the predetermined baseline time period corresponds to at least part of a time period when the set of intercommunicating computer systems are separated from influence by malicious agents.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the steps of the method set out above.

BRIEF DESCRIPTION OF THE DRAWINGS

Embodiments of the present disclosure will now be described, by way of example only, with reference to the accompanying drawings, in which:

FIG. 6 is a flowchart of a method for generating vector representations for computer systems based on deterministic walks of a graph representation of communications between computer systems in accordance with embodiments of the present disclosure.

DETAILED DESCRIPTION

Figure 1:
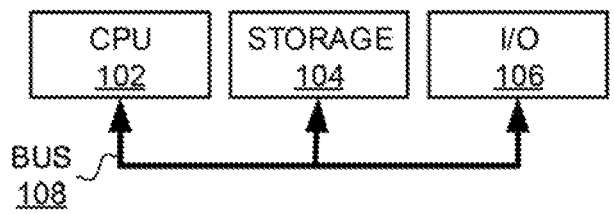
FIG. 1 is a block diagram a computer system suitable for the operation of embodiments of the present disclosure.

Networks of computer systems can be represented as graphs of interconnected nodes. Physical or virtual computer systems can be physically or virtually connected to other such systems by way of, for example, a physical or virtual communications network. Computer systems can be represented as nodes with communications therebetween represented as edges in a graph representation. Nodes can have associated characteristics corresponding to characteristics of represented computer systems such as unique identifiers, technical, functional or locational characteristics. Edges between nodes correspond to communications between computer systems corresponding to the nodes such as a volume, frequency, type, speed (e.g. throughput) of data, an effectiveness of communication (e.g. a degree of error in the communication), a level of security of the communication (e.g. presence, absence or a degree of encryption) or other communication characteristics. Notably, such edges relate to communication between nodes (representing computer systems), not the very existence of means for achieving such communication (e.g. network connections). Thus, a graph representation of such communicating computer systems represents communications at a point in time or over a period of time between computer systems represented in the graph.

Embodiments of the present disclosure provide for a comparison between graph representations of communicating computer systems such that anomalous behavior of a computer system can be detected. Detection of such anomalous behavior can lead to the implementation of mitigation measures to protect computer systems from potentially malicious communications. In particular, embodiments of the present disclosure determine a baseline graph representation of a set of communicating computer systems including nodes corresponding to computer systems and edges corresponding to communications therebetween. The baseline graph is determined for a time when the communicating computer systems are determined to be free from malicious intervention, such as when the computer systems are operating in a protected environment such as a network not being accessible to, or susceptible to, external communications from untrusted systems, for example, a pre-production operation of the communicating computer systems. Further, embodiments of the present disclosure determine a graph representation of the computer system corresponding to the computer system in production operation during which the detection of anomalous system behavior is sought. Embodiments of the present disclosure are directed to providing techniques for the effective comparison of graphs corresponding to each of the baseline operation and production operation of the communicating computer systems so as to detect anomalous computer system behavior in the production operation.

Embodiments of the present disclosure allow subgraphs (graphs with the same set of nodes and, potentially, edges as each other) to be compared with each other. By looking at how nodes are connected to other nodes (edges) and utilising an attribute between pairs of nodes, a measurement of how edges and attributes change from one subgraph to another can be made. Before a measurement can be made, edges and attributes of a subgraph must be converted into a format which will allow comparisons with other subgraphs. This conversion technique is called "embedding" and will be used for each subgraph to be compared. Each subgraph can be a representation of how all nodes of the subgraph are connected to each other at a particular point in time, or over a particular period of time, so that changes to a node's connections correspond to a change of behavior of the node. This behavior change of a node is a measurement performed when comparing two subgraphs.

Graph comparison techniques rely on a node's "degree" within a graph. A degree is the number of edges belonging to a node. Depending on where is located within a graph its "centrality" may change as well. A determination of centrality identifies most influential nodes and can be influenced by node positions and degrees. A problem with centrality is there are multiple differing mechanisms for determining such a characteristic and it is difficult to know which type of centrality measure should be employed in dependence on a particular subgraph. Another technique is "PageRank" ("The PageRank Citation Ranking: Bringing Order to the Web" (Page et al., 1999)) which scores nodes depending on a number of references (directed edges) from other nodes. PageRank sums all scores in a graph to one, which means it is infeasible to compare multiple graphs with this technique.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Machine learning is a form of artificial intelligence which allows a machine to learn a model of a process by applying statistical techniques on observed data. This means a machine can predict an outcome when given new, previously unseen data. An example of how machine learning has benefited people is language translation. By having a machine learn several translations from one language to another, the machine can "learn" how words are associated with each other. When a new phrase is entered, the machine can refer to previously seen examples and predict what the translation should be. Machine learning attempts to mimic how humans learn; observe experiences and recall on these when presented something new. Many machine learning techniques have been developed: from utilizing basic mathematical models like linear regression to emulating how a brain works through the use of "neural networks".

One machine learning technique which can be employed in embodiments of the present disclosure is known as "word embedding". Word embedding transforms words in a vocabulary into a set of vectors consisting of real numbers. The reason for this process is to allow a machine to represent a meaning of a word in relation to other words. Unlike a human, a machine does not know the meaning of a word but it can work with vector representations of words to represent the meaning of a word. One method of converting words into vectors is known as "Word2Vec" ("Efficient Estimation of Word Representations in Vector Space", Mikolov et al., 2013). Word2Vec is a collection of models for representing words in a corpus of text as a collection of vectors denoting how similar they are to each other depending on sentence context. It involves training a neural network to associate words with each other depending on where they lie within a context. The neural network itself (specifically its weight matrix) is the word embedding and it can be used to predict the context of a given word which appeared in the corpus.

Figure 2:
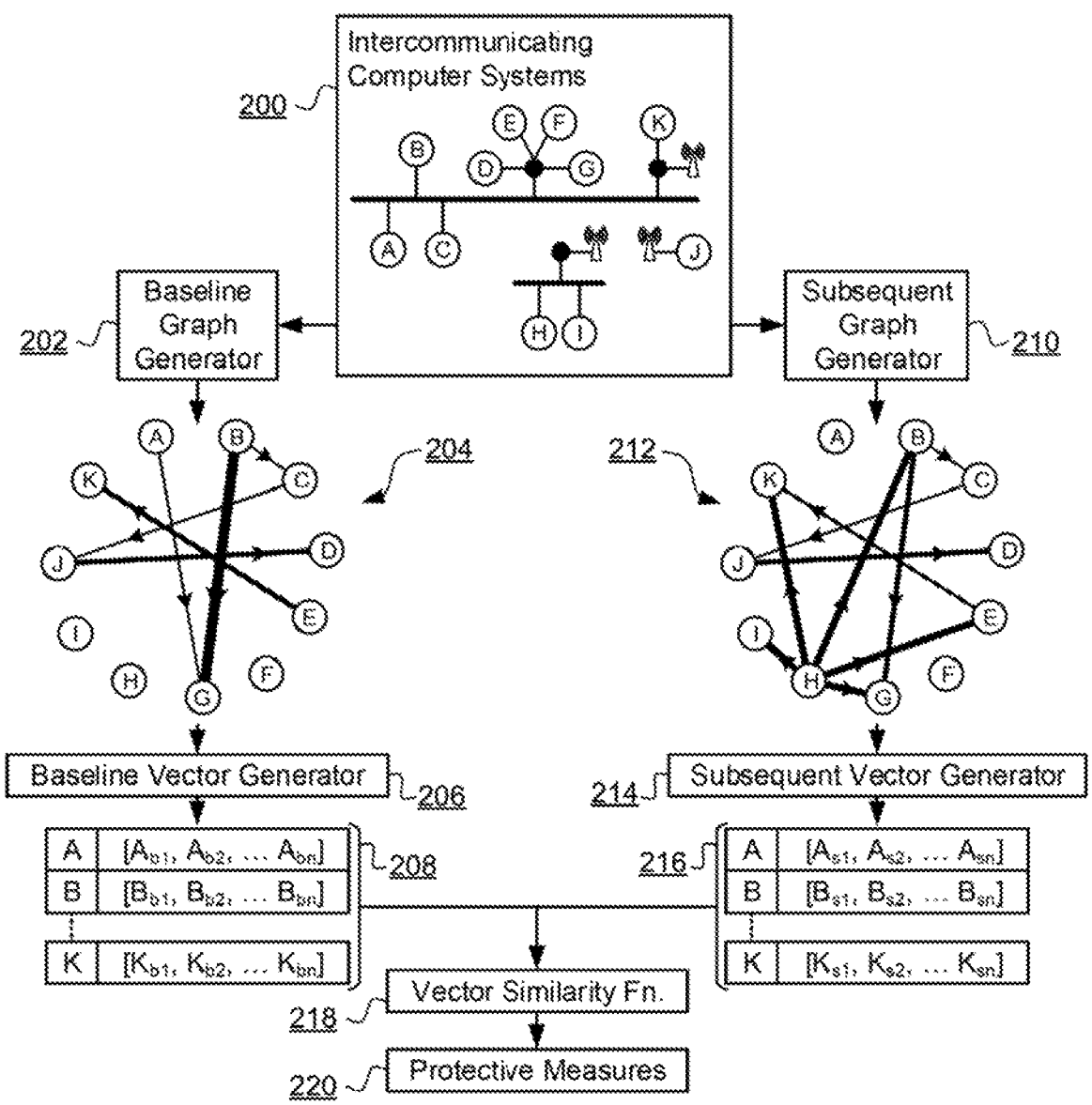
FIG. 2 is a component diagram of an arrangement for identifying anomalous behavior of a computer system in a set of intercommunicating computer systems in accordance with embodiments of the present disclosure.

Embodiments of the present disclosure identify anomalous behavior of a computer system in a set of intercommunicating computer systems such as physical or virtual computer systems communicating via one or more physical or virtual computer networks in which each computer system is uniquely identifiable (such as by way of an identifier, name, address or other suitable identification). FIG. 2 is a component diagram of an arrangement for identifying anomalous behavior of a computer system in a set 200 of intercommunicating computer systems in accordance with embodiments of the present disclosure. The set 200 of computer systems are arranged for intercommunication by way of, for example, one or more wired or wireless communications networks. As illustrated in FIG. 2, such networks can be disparate in technology, topology and/or architecture such as a linear, hierarchical, star, wireless, cellular or any other suitable intercommunication means for computer systems. In the exemplary set 200 of computer systems of FIG. 2, eleven computer systems labeled "A" through "J" are depicted, each being communicatively connected to one or more other of the computer systems in the set. Embodiments of the present disclosure are operable to monitor communications between the computer systems in the set 200 so as to generate graph representation of communications between the computer systems. Notably, such graph representations of communications do not necessarily correspond to the architecture, topology or arrangement of computer networks interconnecting the computer systems. Rather, such graph representations model actual communications between systems in the set 200.

Graph representations are generated in two phases of operation of embodiments of the present disclosure. In a first phase, one or more baseline graphs are generated to represent communications between computer systems in the set 200 occurring to at least part of a time period when the set 200 of intercommunicating computer systems are determined to be unaffected by potentially or actually malicious agents such as malicious software, viruses, botnets or other malicious activity. For example, the set 200 of systems can be separated from influence by potentially or actually malicious agents. In such first phase of operation, the set 200 of computer systems can operate in a pre-production environment, secured environment or environment confirmed to be clean of malicious infection. Subsequently, embodiments of the present disclosure operate in a second phase of operation in which one or more subsequent graphs are generated to represent communications between computer systems in the set 200. In the second phase of operation the set 200 of computer systems operate in, for example, a production mode of operation in which there is a possibility of influence of malicious agents such as the introduction of malware, the activity of botnets or other malicious occurrences potentially affecting one or more of the computer systems in the set 200.

In each phase of operation, embodiments of the present disclosure generate vector representations of network communication derived from the generated graphs such that a set of baseline vectors is generated derived from the baseline graph(s) with a baseline vector generated for each node in the baseline graph corresponding to a computer system in the set 200. Further, a set of subsequent vectors is generated derived from the subsequent graph(s) such that a subsequent vector is generated for each node in the subsequent graph corresponding to a computer system in the set 200. The baseline and subsequent vectors for each computer system are comparable using a vector similarity function to identify anomalous behavior of a computer system operating in the production mode of operation vis-à-vis its operation in the pre-production (baseline) mode of operation. Such anomalies correspond to a behavioral change of one or more computer systems in the set 200 and can trigger the implementation of protective measures for one or more of the computer systems or the entire set 200.

Protective measures can include, for example, the deployment of firewalls, new security measures, additional authentication or authorization checks, execution or updating of antimalware services, preventing communication with one or more computer systems or the whole set 200, increasing a level of monitoring, tracing or logging and other protective measures as will be apparent to those skilled in the art.

Thus, in the arrangement of FIG. 2, a baseline graph generator as a hardware, software, firmware or combination component, generates a baseline graph data structure 204 representing communication between computer systems in the set 200 of intercommunicating computer systems. Each of at least a subset of the computer systems in the set 200 is provided as a node in the graph 204 with communications therebetween represented as weighted directed edges in the graph 200. As depicted in FIG. 2, edges are directed to indicate a net flow of traffic and are weighted (indicated by thickness of an edge) to indicate a volume of traffic. A "net" flow of traffic is a predominant direction of transfer of communicated data such as payload data in network communication, recognizing that network communication can be bidirectional including at least the negotiation, setup and/or configuration of a communication by way of protocol messages to achieve the delivery of a payload or portion of data as the substantive subject of the communication. For example, network communication corresponding to a request for a web-page by a web-browser being communicated to a web-server will involve communication of the request from the browser to the server with the substantive data transfer being realized as the communication of the web-page content from the server to the browser. Thus, the net flow is from the server to the browser and can be determined, in this example, based on the volume of data transferred. Other mechanisms to determine the net flow of data can be employed including mechanisms that infer the direction of net flow of data based on an analysis, inspection or other identification of the data to determine the substantive part of a communication between computer systems.

FIG. 2 further includes a baseline vector generator 206 as a hardware, software, firmware or combination component arranged to generate a vector representation 208 of communication for each node in the baseline graph 204. In one embodiment, the baseline vector generator 206 uses Word2Vec or, preferably, Node2Vec which uses node identifiers as words and paths through the baseline graph 204 as sentences into a typical Word2Vec model ("On Generalizing Neural Node Embedding Methods to Multi-Network Problems", Heimann and Koutra, 2017). The paths can be generated by random walks (traversals of the graph) for a node in the baseline graph 204, as will be described in more detail later. Due to the non-deterministic nature of Node2Vec (arising because it employs random walks to generate a corpus for Word2Vec) it is preferably to combine a plurality of such random walks to generate a representative vector for a node, the representative vector being defined based on a combination of the plurality of walks of the graph for a node (the node representing a computer system). Combining multiple vector representations into a single representation can be achieved using a simple average vector. Alternatively, an orthogonal transformation vector for each of a plurality of pairs of vector representations for the node can be generated such that the orthogonal transformation vector transforms a first vector in each pair to a second vector in the pair. A linear optimization process operating on the orthogonal vectors by, for example, linear regression, can be used to define a combination vector representation for a node in the graph 204.

Thus, in this way, embodiments of the present disclosure generate baseline vector representations 208 for each node in the baseline graph 204. Such baseline vector representation 208 and the baseline graph 204 are generated during a time period when the intercommunicating computer systems 200 are not susceptible to malicious attack such as malware, botnets or the like. In this way the baseline vectors 208 constitute a baseline for comparison to identify anomalies during production operation of the computer systems when the set 200 of systems may be subject or susceptible to attack or intrusion. Accordingly, during production operation of the set 200 of intercommunicating computer systems a subsequent graph generator 210 as a hardware, software, firmware or combination component is operable to generate subsequent graph 212. The subsequent graph generator 210 can be operationally identical to the baseline graph generator 202 except that the subsequent graph generator 210 is operable during execution of the computer systems in a production mode of operation, when potentially subject or susceptible to attack. In some embodiments, the baseline graph generator 202 and the subsequent graph generator 210 are one and the same. The subsequent graph 212 is comparable with the baseline graph 204 by way of vector representations. Thus, a subsequent vector generator 214 (which is operationally identical to the baseline vector generator 206 and can be one and the same) is operable to generate a vector representation of the subsequent graph 212 as a subsequent vector 216 for each node in the subsequent graph 212.

The subsequent vector representations 216 can be generated periodically each corresponding to a particular period of time such that the subsequent vectors 216 can be compared with the baseline vectors 208 to identify anomalies in the subsequent vectors with respect to the baseline vectors. The comparison is made by a vector similarity function 218 such as a cosine similarity function for comparing vectors as is known in the art. Where a subsequent vector for a node in the subsequent graph 212 corresponding to a computer system in the set 200 is sufficiently dissimilar to a baseline vector for a node in the baseline graph 204 corresponding to the same computer system, then an anomaly is identified. Sufficiency of dissimilarity (or similarity) can be predetermined in terms of a degree of difference characterized in dependence on the particular vector similarity function 218 employed—such as an angular difference, an extent of vectoral magnitude difference or a combination or other such characterizations of difference as will be apparent to those skilled in the art. Protective measures 220 can be implemented to protect one or more of the computer systems in the set 200 of intercommunicating computer systems in dependence on the detection of an anomaly by the vector similarity function 218.

Figure 3:
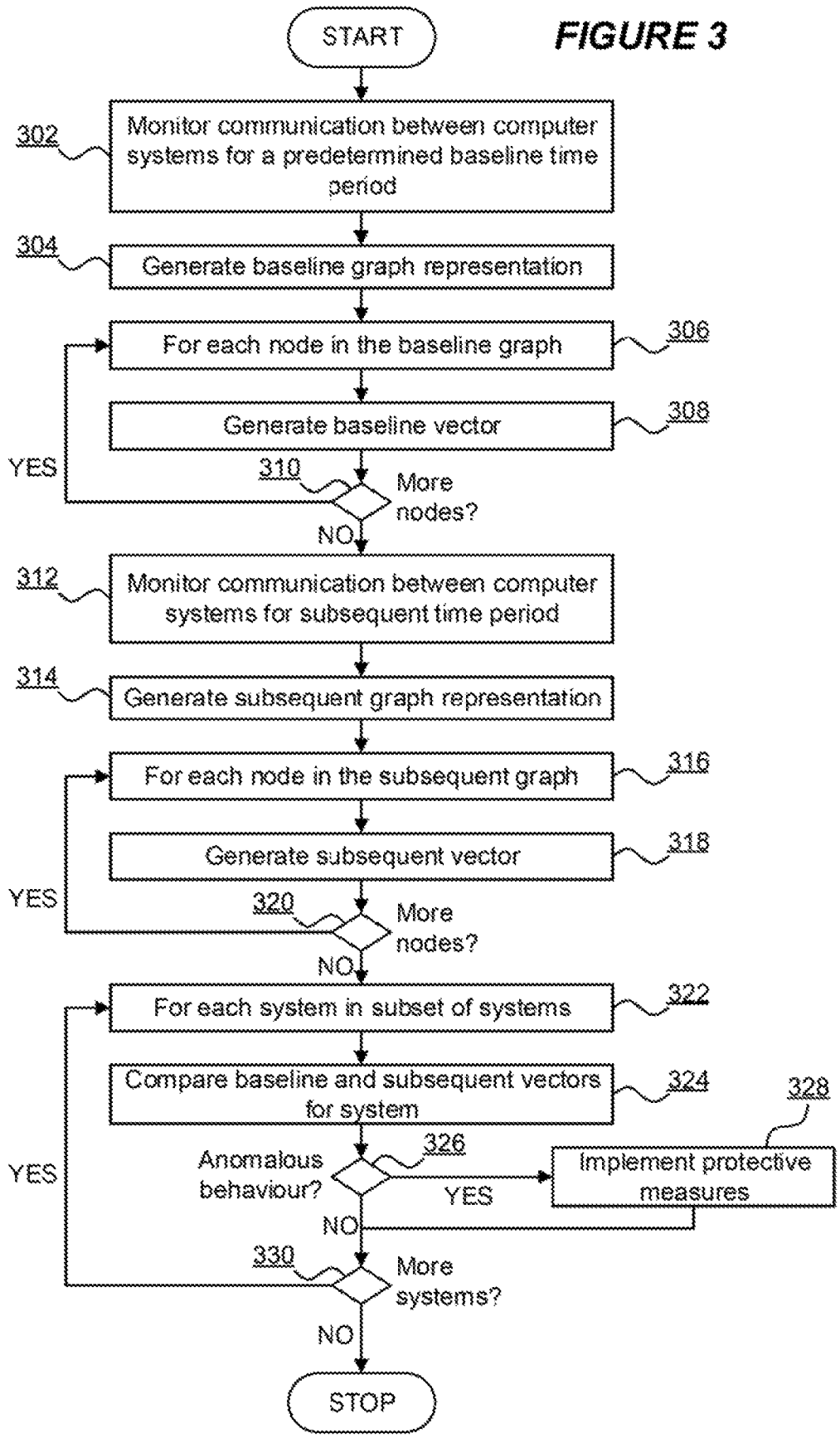
FIG. 3 is a flowchart of a method for identifying anomalous behavior of a computer system in a set of intercommunicating computer systems in accordance with embodiments of the present disclosure.

FIG. 3 is a flowchart of a method for identifying anomalous behavior of a computer system in a set of intercommunicating computer systems in accordance with embodiments of the present disclosure. Initially, at 302, communication between computer systems in the set 200 for a predetermined baseline time period is monitored and at 304 a baseline graph representation of the systems is generated in which nodes of the graph correspond to computer systems in the set and weighted directed edges between nodes of the graph correspond to a characteristic of communication between pairs of computer systems in the set 200. At 306 to 310 a baseline vector representation is generated for each node in the baseline graph based on a combination of a plurality of walks of the graph for the node. At 312 communication between computer systems in the set 200 for a subsequent time period is monitored. The subsequent time period is a predetermined period of time during which the computer systems operate in a production mode of operation. At 314 a subsequent graph representation of the systems is generated in which nodes of the graph correspond to computer systems in the set and weighted directed edges between nodes of the graph correspond to a characteristic of communication between pairs of computer systems in the set 200. At 316 to 320 a subsequent vector representation is generated for each node in the subsequent graph based on a combination of a plurality of walks of the graph for the node. At 322 to 330 baseline and subsequent vectors for nodes corresponding to each of a plurality of computer systems in at least a subset of the set 200 of computer systems are compared using a vector similarity function 218. Where anomalous behavior of a computer system is detected at 326, protective measures are implemented at 328.

Figure 4A:
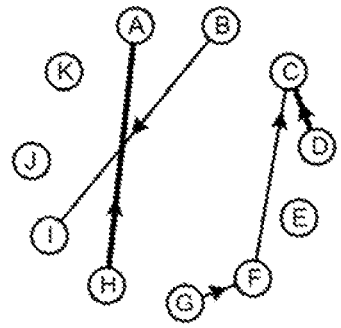
FIGS. 4a, 4b and 4c depict exemplary graph data structures representing intercommunicating computer systems in accordance with embodiments of the present disclosure.
Figure 4B:
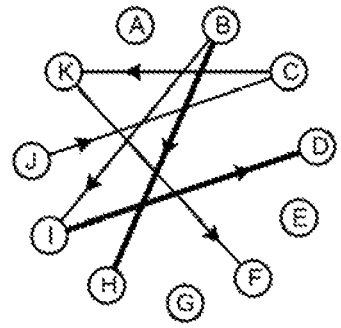
Figure 4C:
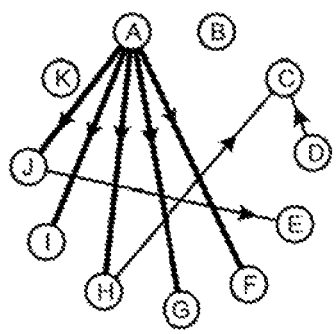

Thus, embodiments of the present disclosure seek to identify a computer system in the set 200 exhibiting a behavior change relative to a baseline representation of its behavior. FIGS. 4a, 4b and 4c depict exemplary graph data structures representing intercommunicating computer systems in accordance with embodiments of the present disclosure. Specifically, FIGS. 4a, 4b and 4c depict graph representations of network traffic for a set of computer systems at different time points. In FIGS. 4a and 4b, computer "A" is showing "normal" behavior (that is, typical behavior for itself), whereas in FIG. 4c, computer "A" is "attacking" several computers, so exhibiting anomalous behavior.

Each edge (arrowed) in FIGS. 4a to 4c is a flow of traffic between a source and a destination computer and the weight (thickness) represents an attribute of the flow. This attribute can be the number of connections/flows between two computers, the number of bytes or packets sent or an aggregation of these. In the example of FIG. 4c the number of simultaneous flows between computer "A" and others has increased (hence the thicker arrows). As this behavior was not observed before it is likely that an attack (for example a denial of service attack) is occurring.

To identify this anomalous behavior embodiments of the present disclosure employ machine learning techniques such as Node2Vec to convert each graph into an embedding so that differences in a node can be measured between embeddings. Node2Vec is a version of Word2Vec which uses node identifiers as words and paths through a graph as sentences in a Word2Vec model. The paths are generated by random walks from each node in a graph. These random walks can be configured to walk close to neighboring nodes (akin to breadth-first search) or walk across the structure of the graph (akin to depth-first search). A next step to take in a walk can be determined by edge probabilities. These probabilities can be calculated by an attribute of an edge (for example, an attribute of flow), such as by normalizing the attribute among all edges and applying the breadth/depth-first search configurations. In the context of monitoring computer behavior, attacks may be more likely to occur in respect of neighboring computer systems rather than systems on the other side of a network. Therefore, a larger breadth-first search parameter can be employed, for example.

Figure 5A:
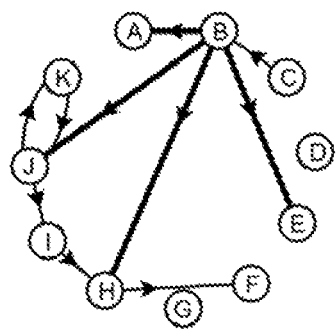
FIGS. 5a and 5b depict exemplary graph data structures of representing intercommunicating computer systems in accordance with embodiments of the present disclosure.
Figure 5B:
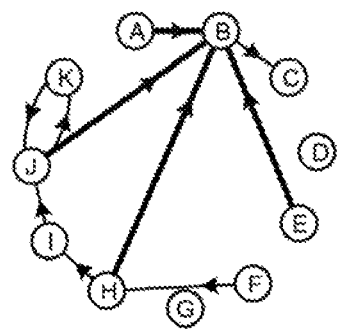

The net flows of network traffic are directed (as previously described). This direction is carried forward during a random walk which can have an effect on which nodes appear in a path. FIGS. 5a and 5b depict exemplary graph data structures of representing intercommunicating computer systems in accordance with embodiments of the present disclosure. In the graph of FIG. 5a, node "B" has relatively heavy weighted edges directed to each of nodes "A", "J", "H" and "E" indicating that computer corresponding to node "B" is sending lots of packets to those target computers. During walks of the graph of FIG. 5a as part of the Node2Vec process, only node "C" can result in a traversal to node "B" because only node "C" has an edge directed to node "B". This means the set of paths (corpus) for training Node2Vec will for all nodes other than node "C" will not involve node "B", despite node "B" representing the most communicative computer system in the set. To remedy this, all edges and their weights are reversed prior to the walking process of Node2Vec, as illustrated in FIG. 5b. In the exemplary graph of FIG. 5b many more nodes now lead to node "B". During the random walks of the Node2Vec process there is an increased chance of walks involving node "B" meaning the path corpus has a higher chance of mentioning node "B" and thus highlighting the impact node "B" has on the graph.

Word2Vec is used to determine the similarity of words within an embedding. In this process, a similarity score is used on vectors within the embedding. For example, the cosine between two vectors can be calculated which is used to determine how similar (i.e. how parallel) they are. In embodiments of the present disclosure, however, each node is to be compared across a set of graph embeddings.

A problem in using Node2Vec is it is a non-deterministic algorithm because it uses random walks to generate the corpus for Word2Vec. This means that every time Node2Vec is used on the same graph with the same parameters, different embeddings can be generated. For effective comparison of vectors to determine anomalies, Node2Vec would preferably operate deterministically producing consistent embeddings no matter how many executions are performed. This would also mean performing a similarity score for the same node among all embeddings should reveal an identical or, at least, much more similar score, for example, using cosine similarity should yield a score tending towards one.

One possible solution to this challenge is to use a different walking strategy known as graph kernelling. Alternatively, a sample average can be calculated from a set of embeddings. Random walking is integral to Node2Vec and for its intended purpose of producing one embedding for a graph, it suits most needs. However, for larger graphs where there are many possible paths, this strategy may be unsuitable. Even increasing a number of iterations during an execution (i.e. the number of walks performed from each node) may not improve the embedding as the training phase is built on previous walks. Another walking strategy could be used, especially if it can be built on hidden Markov models as this is how the graph is constructed as an input to Node2Vec ("What is a Hidden Markov Model?", Sean R Eddy, Nature Biotechnology volume 22, pages 1315-1316, 2004).

Combining of embeddings is considered in "Linear Ensembles of Word Embedding Models" (Muromägi et al., 2017) where an ensemble is created for performing Word2Vec tasks on a small corpus. The technique in Muromägi of combining embeddings (matrices) through a process called "orthogonal Procrustes" leads to more accurate representations of combined embeddings compared to least squares regression. Orthogonal Procrustes produces an orthogonal matrix, given matrices A and B, so that A can be transformed to (closely match) B. As there are multiple matrices to be combined and one matrix is to represent all of them, this process can be adapted into a linear optimization problem so that the process can be run iteratively to produce a matrix as an embedding rather than an orthogonal matrix. Thus, in the above described exemplary embodiments, combining vector representations into a single vector representation for a node can be performed by generating an orthogonal transformation vector for each of a plurality of pairs of vector representations for the node such that the orthogonal transformation vector transforms a first vector in the pair to a second vector in the pair. Linear optimization is then performed on the orthogonal transformation vectors by linear regression. Thus, the different embeddings from each Node2Vec iteration on the same graph and parameters can be combined to produce a representative embedding of the graph.

To evaluate the model, a baseline is required to compare an embedding with, as previously described. This baseline graph (and resulting vector embedding) should represent the normal state of the environment. The baseline graph can also be an aggregation of graphs which is especially advantageous if time windows are to be used to observe changes. As previously described, a baseline graph and embedding are generated for a period of time where traffic behavior is expected to be normal (nothing malicious occurring). Since traffic can change over time (and may have temporal, seasonal or other effects, such as peak and off-peak work hours), time windows can be used to observe traffic during different periods of time. When constructing a baseline graph multiple constant observations are aggregated to form the baseline graph.

During observations of live data at a production time of operation of computer systems, new (subsequent) graphs are generated which have the same nodes as the baseline graph (but not necessarily the same edges and edge properties which depend on the intercommunications between the computer systems). Before the subsequent graph can be used it is preferably aggregated with the baseline graph to smooth out any noise. Once the observed graph has been aggregated and smoothed, it goes through the Node2Vec and Procrustes mechanisms to produce another representative embedding to be used for comparing with the baseline embedding.

The two representative embeddings, baseline and subsequent observation, can be compared to show how a node has changed behavior (how the edges have changed) between baseline and subsequent observation. Since an embedding is a collection of vectors, the vectors of the same word (i.e. node having a node identifier) from each embedding are compared against each other using the vector similarity function. For example, cosine similarity can be used to show how parallel two vectors are—parallel vectors have a score of 1, perpendicular vectors have a score of 0 and opposite-facing vectors have a score of −1. Other similarity scores can be used as will be apparent to those skilled in the art.

For example, network traffic can be collected to generate a baseline representational embedding and production (subsequent) representational embeddings. A time window of one hour can be used per observation and a full day's worth of traffic is to be used to generate the baseline. The 24 hours of data can be divided into 24 observations and each one of them can be converted into a graph in which each node represents a computer system in the set 200 and each edge represents a property of a connection between two systems. Some properties can include the number of connections made, number of packets or bytes sent or some other suitable observable property. The 24 network graphs are then aggregated into one graph by, for example, taking a mean of each edge property. The resulting aggregate graph is processed iteratively through Node2Vec with the resulting vectors merged by the Procrustes mechanism to produce a representative embedding of the baseline graph.

During observation of live data from the set 200 of computer systems operating in a production mode of operation, new one-hour network graphs are generated as subsequent graphs with the same edge property used in the baseline graph. Each subsequent network graph is aggregated (and averaged) with the baseline to smooth out any noise (consequently resulting in a 25-hour averaged subsequent network graph). The process of Node2Vec and Procrustes is applied iteratively to the averaged subsequent graph to create a new representative embedding which can be used for comparison.

Each generated embedding arising from a subsequent graph is compared with the baseline embedding using a similarity function as previously described. For each node in the embeddings a similarity score will show how much a computer system represented by the node has changed behavior. If cosine similarity is used, a score close to 1 means the node did not change behavior (constant connections maintained), whereas a score closer to −1 means the node dramatically changed behavior, possibly meaning it was performing an attack. Where an attack is indicated, reactive measures can be employed such as the protective measures previously described.

The generation of a vector representation for a node in the graph by generating a statistically representative vector based on, for example, multiple node2vec executions, has disadvantages. For example, multiple vectors are generated for consolidation into a single vector representation and a particular number of vectors required to arrive at a statistically representative combined vector can be difficult to determine (similar to a difficulty in determining a depth of a deep learning network or a number of training examples for a machine learning algorithm to arrive at a suitably trained machine). Furthermore, the use of random walking of the graph results in a lack of certainty that independently generated vector embeddings will be comparable due to the non-determinative nature of the walking process. While the non-determinative nature of the walking process can be suitably mitigated by consolidating a multiplicity of walks, the selection and number of such walks is itself challenging to determine. Accordingly, it would be advantageous to overcome this challenge for embodiments of the present disclosure.

FIG. 6 is a flowchart of a method for generating vector representations for computer systems based on deterministic walks of a graph representation of communications between computer systems in accordance with embodiments of the present disclosure. In accordance with embodiments of the present disclosure, the flowchart of FIG. 6 is applicable to the generation of the baseline vector 308 and the generation of the subsequent vector 318 in FIG. 3. The use of a reproducible deterministic walk of a graph as a basis for the generation of a vector representation removes a need to combine a plurality of walks of the graph to generate a representative vector representation. Accordingly, the selection of an appropriate number of such walks for combination is also avoided.

Firstly, at 602, the nodes in at least a subset of the graph (and in some embodiments all nodes in the graph) are ordered using a deterministic ordering function. In some embodiments, the nodes are ordered based on a degree of each node (i.e. a number of edges for each node). Where multiple nodes share the same degree, an ordered differentiation of the nodes can be made based on a characteristic of each node sharing the same degree. For example, a unique identifier of each node can be used to order the nodes, such as by ordering the nodes in order of their identifier using a suitable means (e.g. an alphabetic, alphanumeric or numeric identifier can be readily ordered). Thus, in such embodiments, the degree of each node constitutes at least part of the basis for determining an order of the nodes.

Subsequently, at 604, the method proceeds to iterate through nodes in the ordered set of nodes starting with a first node in the ordered set. At 606, for a current node, a walk of the graph commencing with the current node is undertaken. Thus, the walk is performed for the current node which constitutes the start node of the walk. Such current node is therefore referred to herein as the current start node.

The walk is constituted by 608 to 612 of the method in which, initially at 608, determines if a stopping condition for the walk is met. A walk for a start node in some embodiments stops after a predetermined number of edge traversals (or node visits) in order to limit the maximum length of the walk. Such a limit thus constitutes a stopping condition. Another stopping condition can include a condition that a total weight of all edges from the node exceeds a particular value, such as a total weight must be greater than zero. Other suitable stopping conditions will be apparent to those skilled in the art.

Where the stopping condition is not satisfied the method proceeds to 610 where an edge to traverse next in the walk is determined based on a deterministic edge selection function. The edge selection function is a function that determines which edge, from a particular node, the walk should take next and is deterministic such that the function always determines the same edge in the same circumstances. In some embodiments, the edge selection function selects an edge based on weights of edges for a node. For example, the edge selection function identifies the edge having the greatest weight by, e.g., comparing the weights of the edges for the node. In such an embodiment, multiple edges sharing the same weight can be differentiated in an ordered manner by, for example, ordering the nodes to which each edge leads using a characteristic of such nodes. Such a characteristic can be a unique identifier of the nodes so that the nodes can be ordered in a deterministic way so that the edge selection function can identify deterministically which edge should be walked next. Subsequently, at 612, the determined edge is walked and the method iterates to 608 until the stopping condition is met.

In one embodiment, the selection of an edge by the edge selection function at 610 for traversal of the edge at 612 further comprises decreasing a weight of the edge so that the weight of the edge when it is traversed reduces. In this way, frequently traversed edges are progressively deemphasized deterministically in terms of the edge selection function for subsequent walks of the graph.

When the stopping condition for a walk of the graph for a current start node is met, the walk for the current start node is stored, recorded or otherwise remembered in association with the current start node at 614. The method then determines, at 616, whether each node in the graph has been visited and iterates to 604 accordingly. Notably, the determination at 616 could be to determine if all nodes have been used as start nodes. Alternatively, and in one embodiment, the determination at 616 is whether all nodes have been visited, such visit being constituted as either a start node or as part of a walk of another node as start node.

Thus the method of FIG. 6 generates, for each node in a set of nodes of the graph (start nodes), a single deterministic walk of the graph for the node on which basis a vector representation can be generated using, for example, node2vec or word2vec as previously described.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of identifying anomalous behavior of a computer system in a set of intercommunicating computer systems, each computer system in the set of intercommunicating computer systems being uniquely identifiable, the method comprising:
monitoring communication between computer systems in the set of intercommunicating computer systems for a predetermined baseline time period to generate a baseline vector representation of each of the intercommunicating computer systems;
monitoring communication between computer systems in the set of intercommunicating computer systems for a subsequent predetermined time period to generate a subsequent vector representation of each of the intercommunicating computer systems; and
comparing the baseline vector representation and the subsequent vector representation corresponding to a target computer system using a vector similarity function to identify anomalous behavior of the target computer system in the subsequent time period compared to the baseline time period,
wherein a vector representation of the target computer system for a time period is generated based on a deterministic walk of a graph representation of communications between the computer systems in which nodes of the graph correspond to computer systems in the set of intercommunicating computer systems and weighted directed edges between nodes of the graph representation correspond to a characteristic of communication between pairs of computer systems in the set of intercommunicating computer systems, wherein the deterministic walk is one of a set of deterministic walks of the graph representation, and the deterministic walks in the set of deterministic walks are conducted in an order determined at least partly by a degree nodes in the graph representation, and wherein a traversal of an edge between nodes for a walk of the graph representation triggers a decreasing of a weight of the traversed edge so as to progressively deemphasize traversed edges for subsequent walks of the graph representation.

2. The method of claim 1, wherein the deterministic walk is a walk of the graph representation commencing at a node corresponding to the target computer system and continuing along edges of the graph representation based on a deterministic edge selection function at each node of the graph representation.

3. The method of claim 2, wherein the edge selection function includes a determination of which edge to traverse for a current node in the graph representation based on a weight of the edge in comparison to weights of other edges for the current node.

4. The method of claim 3, wherein multiple edges having identical edge weights are differentiated deterministically based on a characteristic of a node to which the edge leads in the graph representation such that the determination of which edge to traverse is based on the deterministic differentiation.

5. The method of claim 3, wherein the deterministic walk is bounded to a maximum walk length.

6. The method of claim 1, wherein, where two or more nodes have identical degree, the order of deterministic walks in the set of deterministic walks for the two or more nodes is further determined based on a deterministic ordering of a characteristic of each node.

7. The method of claim 1, wherein the set of deterministic walks includes sufficient walks of the graph representation such that each node in the graph representation is visited at least once across all walks in the set of deterministic walks.

8. The method of claim 1, wherein the vector similarity function is a cosine similarity function.

9. The method of claim 1, wherein the characteristic of communication includes one or more of: a flow of network traffic from a source computer system to a target computer system; or a volume of data communicated from a source computer system to a target computer system.

10. The method of claim 1, wherein a direction of an edge in the graph representation corresponds to a net direction of flow of network traffic between a source computer system and a target computer system in a communication.

11. The method of claim 1, wherein a weight of an edge in a graph representation corresponds to a volume of data communicated.

12. The method of claim 1, further comprising, responsive to the identification of anomalous behavior, implementing protective measures for one or more computer systems in the set of intercommunicating computer systems to protect against malicious communication involving the computer system exhibiting anomalous behavior.

13. The method of claim 12, wherein the protective measures include one or more of: preventing network communication to or from a particular computer system; performing an antimalware task on one or more of the computer systems in the set of intercommunicating computer systems; disconnecting one or more of the computer systems in the set of intercommunicating computer systems; or increasing a level of monitoring of network communication with one or more computer systems in the set of intercommunicating computer systems.

14. The method of claim 1, wherein the predetermined baseline time period corresponds to at least part of a time period when the set of intercommunicating computer systems are separated from influence by malicious agents.

15. A non-transitory computer-readable storage medium storing a computer program element comprising computer program code to, when loaded into a computer system and executed thereon, cause the computer system to perform the method as claimed in claim 1.

16. A computer system comprising:
a processor and memory storing computer program code for identifying anomalous behavior of a computer system in a set of intercommunicating computer systems, each computer system in the set of intercommunicating computer systems being uniquely identifiable, by:
  monitoring communication between computer systems in the set of intercommunicating computer systems for a predetermined baseline time period to generate a baseline vector representation of each of the intercommunicating computer systems;
  monitoring communication between computer systems in the set of intercommunicating computer systems for a subsequent predetermined time period to generate a subsequent vector representation of each of the intercommunicating computer systems; and
  comparing the baseline vector representation and the subsequent vector representation corresponding to a target computer system using a vector similarity function to identify anomalous behavior of the target computer system in the subsequent time period compared to the baseline time period,
wherein a vector representation of the target computer system for a time period is generated based on a deterministic walk of a graph representation of communications between the computer systems in which nodes of the graph correspond to computer systems in the set of intercommunicating computer systems and weighted directed edges between nodes of the graph representation correspond to a characteristic of communication between pairs of computer systems in the set of intercommunicating computer systems, wherein the deterministic walk is one of a set of deterministic walks of the graph representation, and the deterministic walks in the set of deterministic walks are conducted in an order determined at least partly by a degree nodes in the graph representation, and wherein a traversal of an edge between nodes for a walk of the graph representation triggers a decreasing of a weight of the traversed edge so as to progressively deemphasize traversed edges for subsequent walks of the graph representation.

* * * * *